Figure 4:
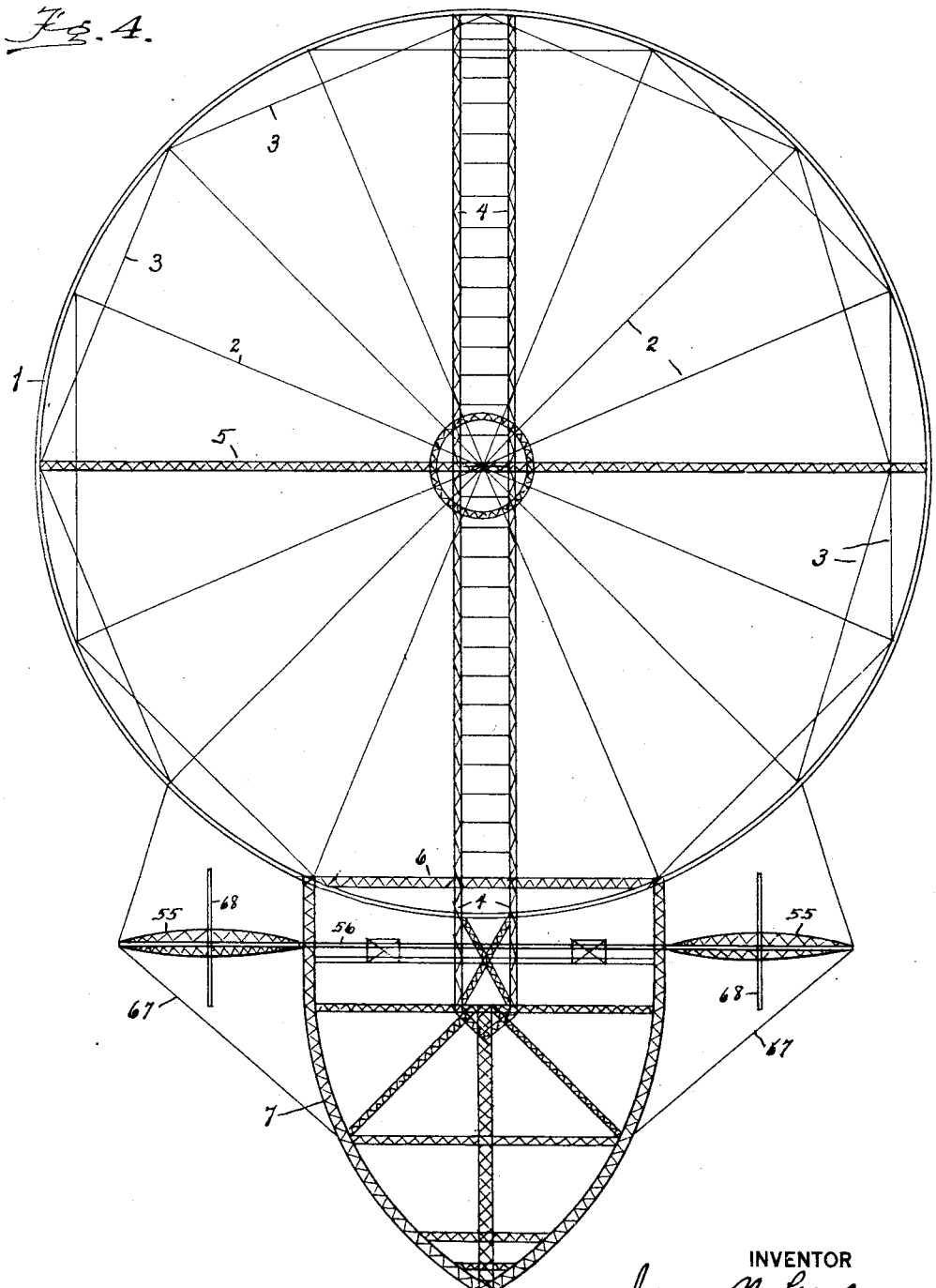

July 23, 1929.  J. N. LEWIS  1,721,631
AIRSHIP
Original Filed Oct. 30, 1925    6 Sheets-Sheet 1
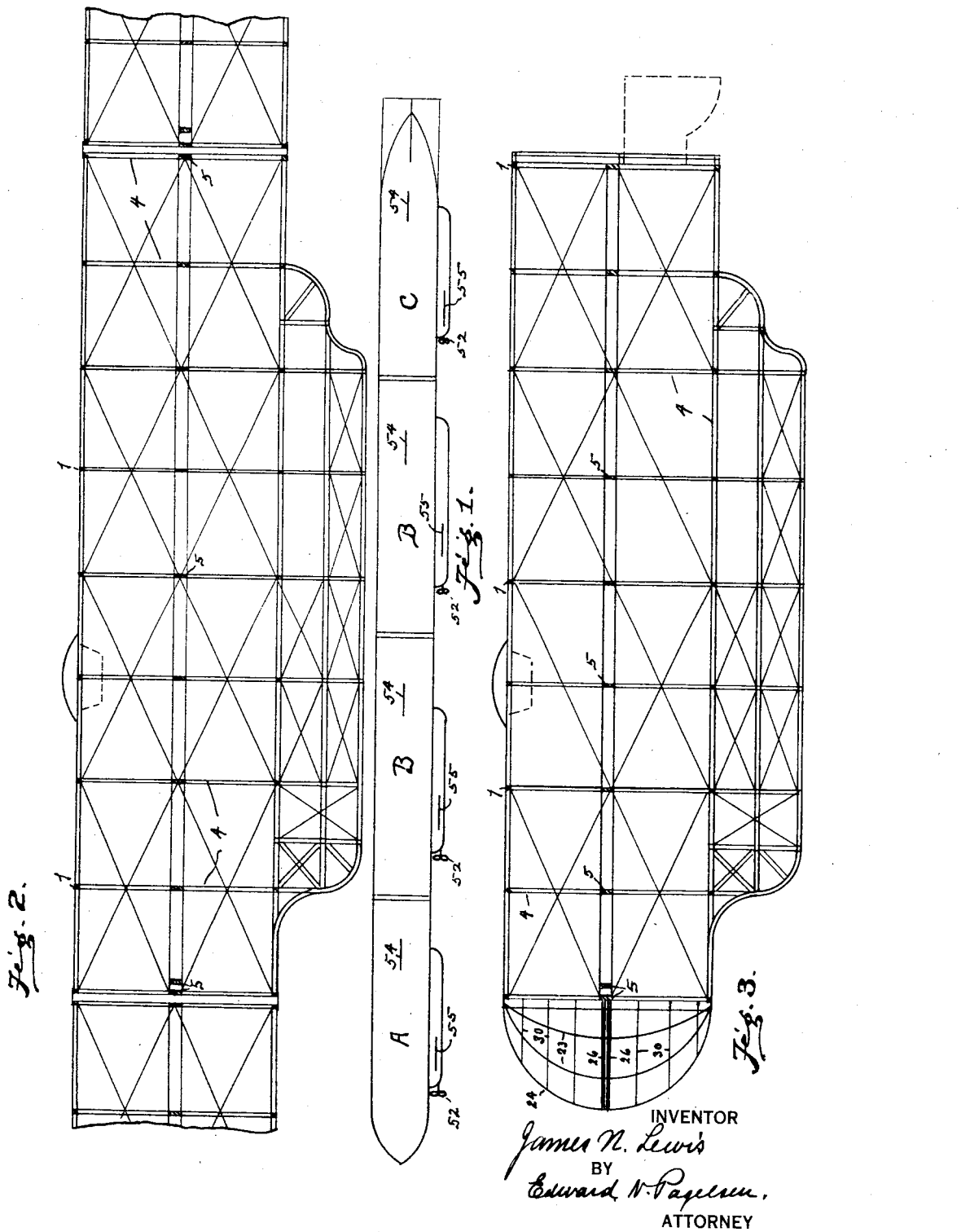

July 23, 1929.  J. N. LEWIS  1,721,631
AIRSHIP
Original Filed Oct. 30, 1925  6 Sheets-Sheet 2

July 23, 1929.　　　J. N. LEWIS　　　1,721,631
AIRSHIP

Original Filed Oct. 30, 1925　　6 Sheets-Sheet 3

INVENTOR
James N. Lewis
BY
Edward N. Pagelsen,
ATTORNEY

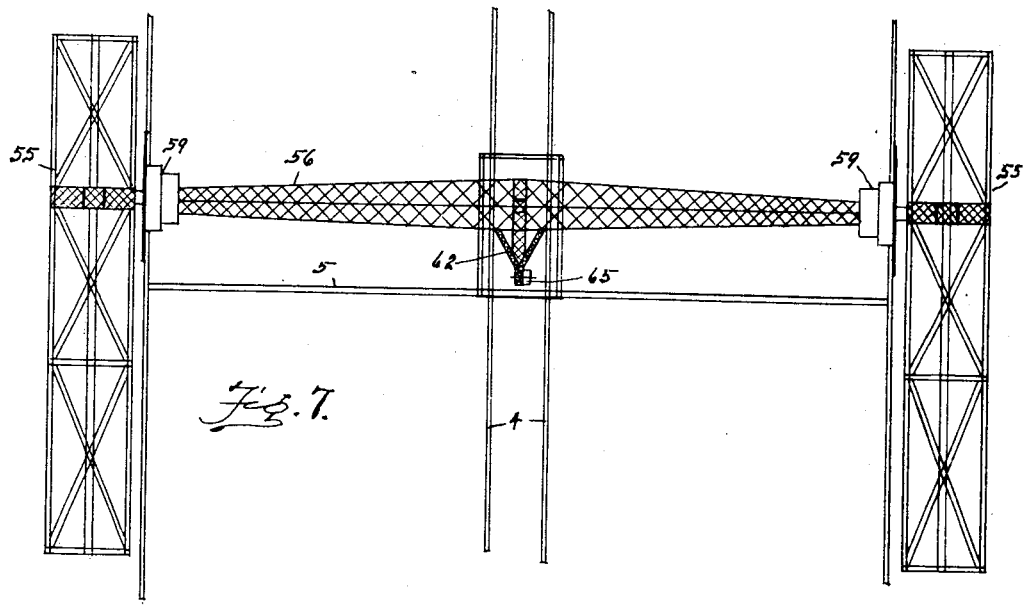
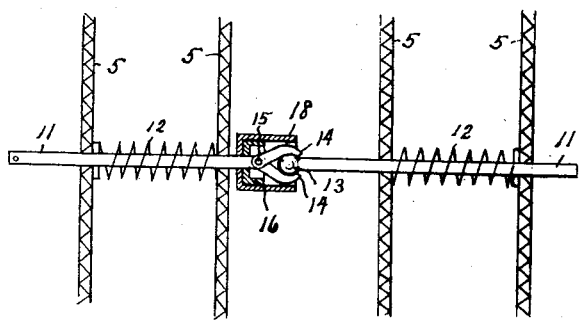
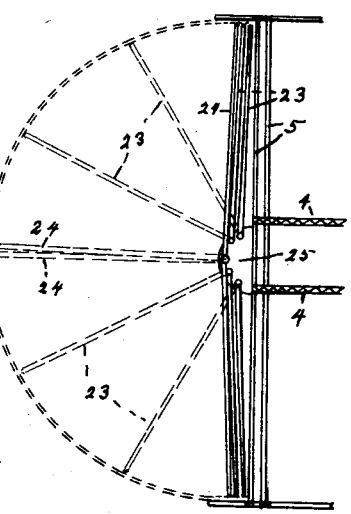
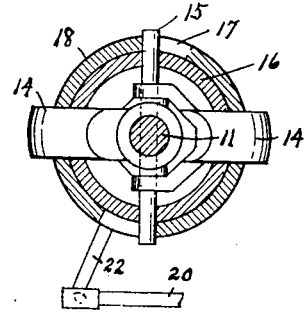
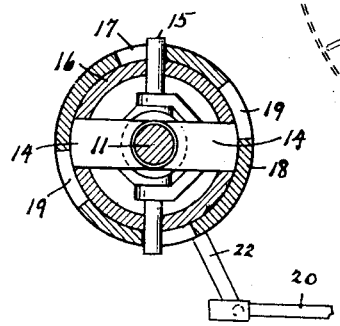

July 23, 1929.  J. N. LEWIS  1,721,631
AIRSHIP
Original Filed Oct. 30, 1925  6 Sheets-Sheet 5

INVENTOR
James N. Lewis
BY
Edward N. Pagelsen,
ATTORNEY

July 23, 1929.  J. N. LEWIS  1,721,631
AIRSHIP
Original Filed Oct. 30, 1925  6 Sheets-Sheet 6
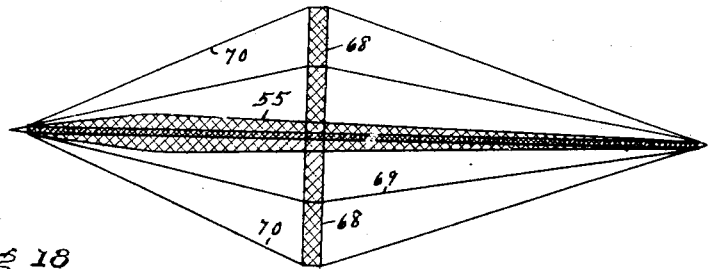
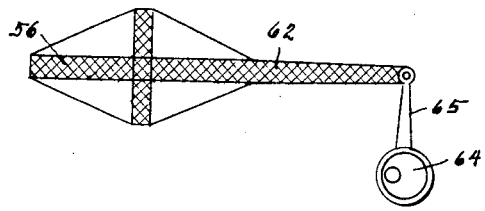
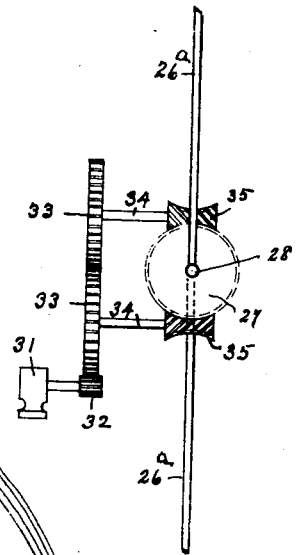
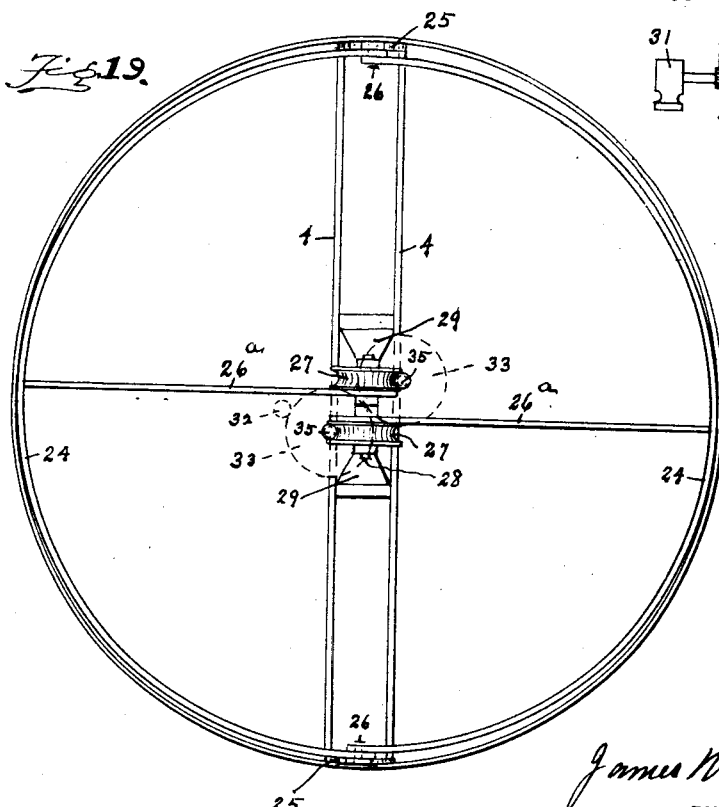
INVENTOR
James N. Lewis
BY
Edward N. Pagelsen,
ATTORNEY

Patented July 23, 1929.

1,721,631

UNITED STATES PATENT OFFICE.

JAMES N. LEWIS, OF NEW YORK, N. Y., ASSIGNOR TO VIRGIL P. RANDALL, TRUSTEE, OF DETROIT, MICHIGAN.

AIRSHIP.

Application filed October 30, 1925, Serial No. 65,742. Renewed December 6, 1928.

The purpose of this invention is to produce an airship of unusual capacity, made up of individual units, each provided with motive power and steering apparatus so that it may be maneuvered independently, but these units being so constructed that they may be united to form an airship which may be under a single control, both as to motors and wings so that a comparatively small crew may operate the entire ship.

A further object of this invention is to provide units having sufficient strength to resist all vertical and horizontal stresses to which they may be subjected when assembled, and at the same time to provide connecting devices between adjacent units which will permit the assembled airship to yield to the sudden and terrific impact stresses to which it may be subjected, such impacts losing much of their effect when the connections are slightly yieldable instead of being absolutely rigid.

Rigid airships of moderate length have withstood heavy storms and may be classed as safe. But when of great length they are subject to such tremendous stresses that disaster has overtaken most of them. The present invention has as its fundamental idea the connecting or uniting of a number of airships of moderate length into a train, each of the units being preferably from three to four times as long as its greatest diameter. I prefer to equip each of the units with proper motive power in order to reduce the stresses on the connections between them to a minimum, such connections being principally for use in steering or maneuvering the train.

I further prefer to unite the units along vertical and horizontal lines so that they may turn in a horizontal plane and have sufficient movement relative to each other in a vertical plane, such movement being provided for by the resilient connections between the units.

In order that each unit may be able to navigate independently, I provide it with proper rudders and with a collapsible or jury bow, all of which may be stowed away while the unit is coupled into the train but may be put into use when the unit is acting for itself.

The framework has been worked out to constitute two parallel vertical trusses extending centrally the length of the ship.

Figure 5:
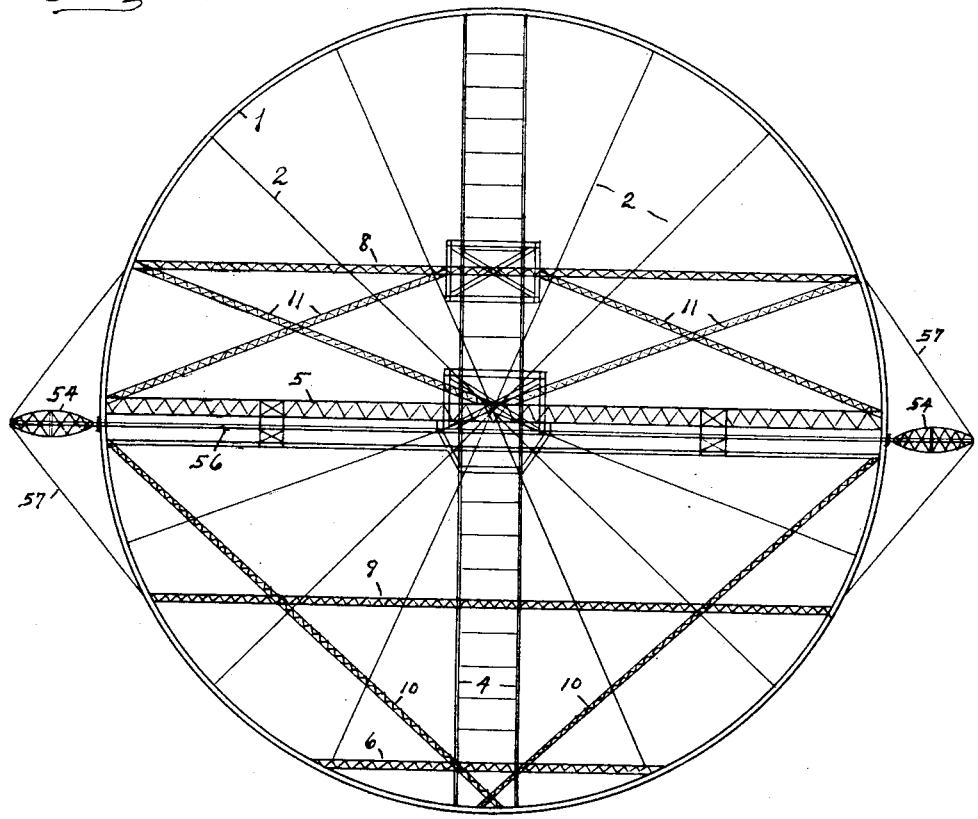
Figure 6:
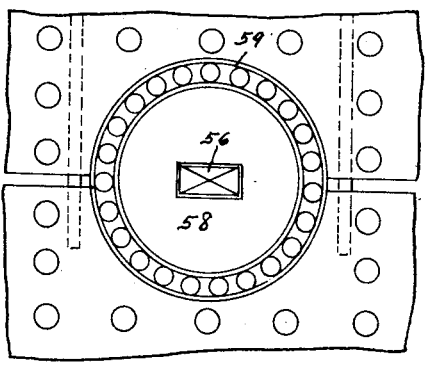
Figure 12:
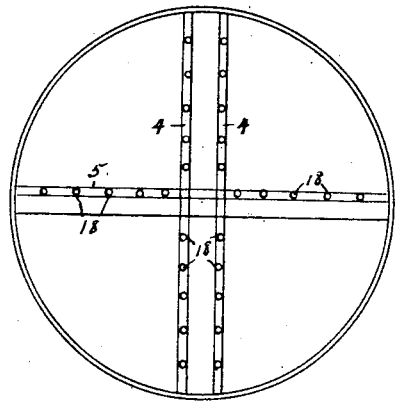
Figure 13:
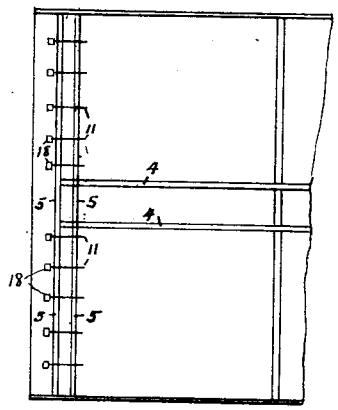
Figures 14, 15, 16:
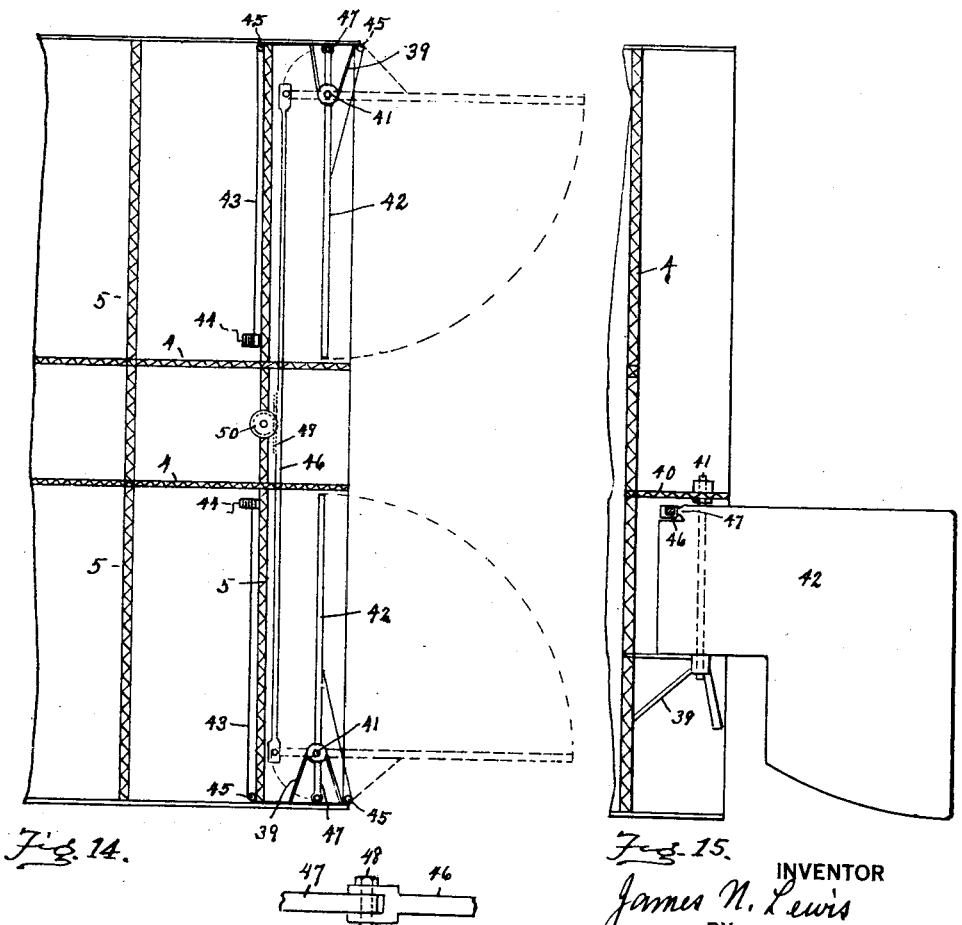

In the accompanying drawings, Fig. 1 is a side elevation of an airship consisting of four units constructed to embody my present invention. Fig. 2 is a central longitudinal vertical section of the framework. Fig. 3 is a similar section showing such a unit with a temporary hemi-spherical front end in open or operative position. Fig. 4 is a cross section thereof on a larger scale showing the main framing of the construction of the nacelle. Fig. 5 is a cross section through the axis of the main elevators. Fig. 6 is an elevation of a bearing for the elevator shafts. Fig. 7 is a plan of a pair of elevators and of the shaft therefor, the coverings of the elevators being omitted. Fig. 8 is a diagram of a hemi-spherical front end. Fig. 9 is a plan of one of the connectors for joining two units. Figs. 10 and 11 are details thereof. Figs. 12 and 13 are diagrams indicating the positions of the connectors. Fig. 14 is a horizontal central section and Fig. 15 is a vertical central section of the rear end of a unit. Fig. 16 is a detail of the steering device. Fig. 17 is a vertical longitudinal section of an elevator. Fig. 18 is a detail indicating the construction of the mechanism for turning the shaft for a pair of elevators. Figs. 19 and 20 are details of the mechanism for swinging the bows which support the fabric which forms the temporary front end of an intermediate unit.

Similar reference characters refer to like parts throughout the several views.

As airships built according to the principles to be hereinafter set forth are cylinders of large size, for example, ninety feet in diameter and three hundred feet long, it is impossible to show the circumferential and transverse lattice truss members which constitute the framework thereof in many of the drawings except by single lines, but the construction of such frame members after their locations are determined is merely an engineering problem which does not involve invention.

The circumferential members or rings 1 (Fig. 4) are braced by radial tension members 2 and chord tension members 3, and also by the two parallel longitudinal trusses 4 of the main frame which extends from end to end of the unit, and the main horizontal struts 5. Gas bags of any desired construction, or gas chambers, are placed in the semi-cylindrical spaces between the main trusses 4 and the shell and longitudinally between the struts 5 and the circumferential members 1 and their reinforcing rods. The space between the vertical trusses 4 is not occupied by the gas bags. Lower cross bars 6 at the rings 1 unite the nacelle 7, which is properly braced and carries the passengers, freight, engines and fuel, to the main trusses 4. If desired, additional braces 8, 9, 10 and 11 (Fig. 5) may be provided at intervals and preferably at the ends of each unit. I prefer to extend the trusses 4 into the nacelle as indicated in Figs. 2, 3 and 4. Any desired reinforcements for the nacelle may be employed.

The units are connected by means of the coupling devices shown in Figs. 9 to 13 inclusive. Main transverse struts 5 extend horizontally from the main longitudinal trusses to the circumferential reinforcements, and at the ends of the units I prefer to use two struts, one behind the other. In these struts and in the ends of the main longitudinal trusses are mounted the coupling members consisting of slidable bars 11, normally held inward of the unit by springs 12. The coupling members of the after unit are preferably formed with balls 13 on their forward end while each bar 11 at the rear end of the leading unit is provided with two heavy clamps or jaws 14, pivoted on the pin 15, which also extends through the wall of the collar 16 and through circumferential slots 17 in the rotatable sleeve 18. This sleeve is also formed with longitudinal slots 19 into which these jaws may swing when the sleeve is turned by the link 20 which connects to an arm 22 extending from the sleeve. When the parts are as shown in Figs. 9 and 11, the jaws are held closed down on a ball 13, but when the sleeve is in the position shown in Fig. 10, the ball can be pulled out so as to disconnect the units. The links 20 may be actuated in any desired manner. When the units are connected, the springs 12 will yield sufficiently under great stresses to permit the units to swing to some extent in every direction relative to each other.

The several units are intended to navigate alone when disconnected from the other units and in order to facilitate independent movements are provided with elevators or adjustable lateral planes, rudders and a collapsible and extensible nose. The nose is built up of a series of substantially semicircular bows 23 and 24, whose upper and lower ends may be pivoted in plates 25 attached to the upper and lower ends of the main trusses 4, the two inner or central bows 24 being mounted on the same pivots 26, as shown in Fig. 19, so that they will swing to the vertical central plane of the unit. These bows carry a fabric covering which is folded in between the bows when they are swung back into the front end of the unit, as shown in dotted lines in Fig. 8. The central bows 24 are swung out by any desired means.

I have shown in Figs. 19 and 20 a pair of arms 26ᵃ attached to worm wheels 27 which are mounted on a shaft 28 carried by plates 29 attached to the main trusses 4. An electric motor 31 carries a pinion 32 which meshes with one of the engaging gears 33 on the worm shafts 34, and the worms 35 thereon swing these arms 26ᵃ out into the axial line of the unit and thereby carry the central bows 24, which are attached to the outer ends of the arms, to the vertical axial plane of the unit, the other bows being pulled out by the fabric covering until a semi-cylindrical nose is produced. I prefer to reinforce the fabric by means of flexible horizontal cables 30 attached to the bows underneath the fabric, and these cables also serve to hold the bows in place when the nose is extended. Reversing the motor causes this nose to collapse and the bows to stow themselves into the space just forward of the forward cross struts 5. The transverse struts 5 at the forward ends of the units are set back sufficiently to receive these bows, and the bars 11 mounted in these bows are of sufficient length to engage the connectors at the rear ends of the leading units.

The first unit A of the assembled airship (Fig. 1) will have a permanent nose and the rear unit C has a permanent tail construction, but the intermediate units are provided with the collapsible structures just described and they, as well as the unit A, are provided with steering devices such as shown in Figs. 14 and 15.

A flat trussed support 40 shown in Fig. 15 extends across the tail end of the unit and supports the upper ends of the shafts 41 whose lower ends are supported by brackets 39 which connect to the circumferential reinforcement of that end of the unit. On each shaft is secured a rudder 42 whose free end extends beyond the cylindrical surface of the unit extended when the rudder is swung out. This may be done by a cable 43 extending from a windlass 44 around the sheaves 45 to the rudder so that when the cable is wound up, the rudder swings to the dotted line position in Fig. 14.

A bar 46 extends transversely of the unit and is adapted to be connected at its ends to the arm 47 on the rudders by means of pins 48 and the central portion of this bar is a rack 49 engaging the pinion 50 which may be turned in any desired manner. The connection between the bar 46 and the arms 47 may be made by hand.

The shell of the unit may be of thin metal or of strong fabric, but the metal is preferred. I prefer to provide each unit with a tractor screw 52 and all the engines as well as the elevator planes of the several units may be controlled from a proper station in the usual manner and the details of this control are therefore omitted. Each unit is provided with two pairs of elevators, each pair being preferably attached to the end of a horizontal shaft, and one shaft 56ᵃ is preferably mounted in the main horizontal plane of the unit nearer the rear end, the other shaft 56ᵃ nearer the front end of the unit and extending across the nacelle. These elevator planes 54 and 55 are indicated in Fig. 1. I prefer to form the elevator planes 55 of greater area and strength than the planes 54.

The shaft 56 which supports the planes 54 is shown supported at its ends by the braces 57 in Fig. 5, and the shaft 56ᵃ is supported by braces 67 in Fig. 4, and in Fig. 6 I have shown this shaft 56 extending through a hub 58 which is carried in a ball bearing in a housing 59 of any desired construction, this housing being attached to the shell just below a transverse strut 5 as shown in Fig. 5. The shaft 61 for the planes 55 may be similarly mounted. I prefer these shafts to be built up lattice work to save weight and an arm 62 is built into the shaft, as shown in Fig. 18.

The arm may be swung up and down in any desired manner, an eccentric 64 and link 65 being shown in Fig. 18. Any desired means may be employed to turn the eccentric.

The planes are preferably of stream-line cross section longitudinally of the airship, as shown in Fig. 17, and posts 68 project from the upper and lower sides to brace the planes with the assistance of the brace rods 69 and 70. The frames of these planes are preferably covered with thin sheets of metal.

When the units are connected into an airship, the leading unit will be one constructed with a pointed forward end and the last unit with proper steering rudders. As each unit is equipped with its own motive power and elevators, the stresses on the various parts of the airship will be much less than if it were a single rigid structure. Furthermore, each of the intermediate units may be separated from the others and after swinging out its temporary nose and rudders, can proceed under its own power to a proper loading station, while the remaining units properly united may continue on their predetermined course.

The details of construction of this airship unit and the proportions of the parts will be determined by engineering calculations by those skilled in the construction of airships of this general character, without departing from the spirit of my invention as set forth in the following claims.

I claim:—

1. In a cylindrical airship unit, the combination of two vertical and parallel truss frames extending longitudinally the length of the unit, spaced circumferential reinforcing rings intermediate and at the ends of said unit, struts extending transversely of the unit at such rings, and connecting devices mounted on the vertical ends of the longitudinal truss frames and on the end transverse struts whereby the unit may be united to other units.

2. In a cylindrical airship unit, the combination of two vertical and parallel truss frames extending longitudinally the length of the unit, spaced circumferential reinforcing rings, struts extending transversely of the unit at such rings, a nacelle united to said truss frames, and an elevator plane extending substantially horizontally from the nacelle.

3. In an air ship unit, a cylindrical shell, a main truss frame extending longitudinally substantially the length thereof, a series of bows pivoted at their upper and lower ends to said frame at one end of the shell, a covering fabric for said bows so that when swung to operative position a substantially hemi-spherical end is formed on the unit, and means to swing said bows to operative position or to stowed position in the end of the shell.

4. In an airship unit, a cylindrical shell, a truss frame extending longitudinally substantially the length thereof, and a collapsible end normally stowed in one end of the shell and means to expand said end to substantially hemi-spherical form.

5. In an airship unit, a cylindrical shell, a truss frame extending longitudinally thereof, a transverse frame connected to the truss frame near one end of the unit, a pair of rudders vertically pivoted on said transverse frame at one end of the unit and normally swung into the end of the unit to extend substantially transversely thereof, means to swing the rudders out parallel to the axis of the unit, and means to operate said rudders to steer the unit.

6. In an airship, a pair of units comprising cylindrical shells and truss frames extending longitudinally thereof, and connecting devices between said units comprising bars slidable longitudinally of the units and springs on the bars to tension them inwardly, and ball and socket couplings uniting the ends of the bars of the adjacent ends of the units.

7. In an airship unit, a cylindrical shell and a nacelle united to the bottom thereof, a pair of horizontal transverse shafts, one at the diametrical plane of the shell and the other extending through the nacelle, an elevator plane at each end of said shafts, and means to turn the shafts to incline said planes to the horizontal.

8. In an airship unit, a cylindrical shell and a nacelle united to the bottom thereof, a pair of horizontal transverse shafts, one at the diametrical plane of the shell and the other extending through the nacelle, an elevator plane at each end of said shafts, and means to turn the shafts to incline said planes to the horizontal, one of said shafts being in the forward half of the unit and the other in the after half.

9. In an airship unit, a cylindrical shell and a nacelle united to the bottom thereof, a pair of horizontal transverse shafts, one at the diametrical plane of the shell and the other extending through the nacelle, an elevator plane at each end of said shafts, and means to turn the shafts to incline said planes to the horizontal, the upper shaft being in the after half and the lower shaft in the forward half of the unit.

10. In an airship unit, a cylindrical shell and a nacelle connected to the botom thereof, a pair of elevator planes pivotally mounted on the shell at one side of the longitudinal center thereof, a second pair of elevator planes pivotally mounted on the nacelle at the other side of the longitudinal center of said shell, and means to position said planes.

JAMES N. LEWIS.